3,184,429
POLYMERIC ORGANOBORON COMPOUNDS
George W. Willcockson, Anaheim, Calif., assignor to United States Borax & Chemical Corporation, Los Angeles, Calif., a corporation of Nevada
No Drawing. Filed Jan. 31, 1962, Ser. No. 170,230
4 Claims. (Cl. 260—47)

The present invention relates as indicated to a new class of polymeric organoboron compounds and has further reference to a method for preparing these polymeric compounds.

It is, therefore, the principal object of the present invention to provide a new class of thermally stable polymeric compounds.

It is a further object of this invention to provide an efficient method for preparing these thermally stable polymeric compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises polymeric organoboron compounds having the recurring structural unit

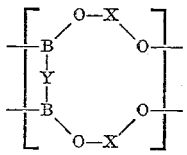

where X is a radical selected from the group consisting of 1,3-phenylene, 1,4-phenylene and 4,4'-biphenylene, and Y is a radical selected from the group consisting of 1,3-phenylene and 1,4-phenylene.

The present polymeric compounds are excellent adhesives and can be used for bonding together such materials as glass, wood and metal. They also find utility as binders in the preparation of fiberglass cloth laminates, and they can be used as molding and casting resins. These polymeric compounds exhibit a high degree of thermal stability at temperatures up to about 500° C., and as such they will find a variety of industrial applications as adhesives and binders for structural composites which are to be subjected to high temperature environments.

The preparation of the polymeric organoboron compounds of the present invention can best be illustrated by the following equation:

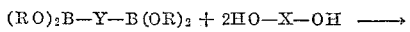

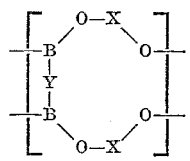

where X is 1,3-phenylene, 1,4-phenylene, or a 4,4'-biphenylene radical, Y is 1,3-phenylene or a 1,4-phenylene radical, and R is an alkyl radical of from 1 to 6 carbon atoms or phenyl. The applicable dihydroxy reactants, having the formula HO—X—OH, where X is 1,3-phenylene, 1,4-phenylene, or a 4,4'-biphenylene radical, are resorcinol, hydroquinone and p,p'-biphenol, respectively; all are well known and commercially available compounds.

As shown above, the organoboron compounds applicable to the present invention have the formula

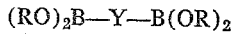

where Y is either 1,3-phenylene or a 1,4-phenylene radical, and R is an alkyl radical of from 1 to 6 carbon atoms or a phenyl radical. The preparation of benzenediboronate esters, which are also referred to as bis(dialkoxyboryl)- or bis(diaryloxyboryl)-benzenes, has been described in "Journal of the American Chemical Society," 1957, vol. 79, page 3081.

The following list is illustrative of the benzenediboronate esters applicable to the present invention:

1,3-bis(dimethoxyboryl)benzene
1,4-bis(diethoxyboryl)benzene
1,3-bis(di-n-propoxyboryl)benzene
1,4-bis(diisopropoxyboryl)benzene
1,3-bis(di-n-butoxyboryl)benzene
1,4-bis(diisopentoxyboryl)benzene
1,3-bis(di-n-hexoxyboryl)benzene
1,4-bis(diphenoxyboryl)benzene
1,3-bis(diphenoxyboryl)benzene It is to be clearly understood that the foregoing list is only a partial enumeration of the benzenediboronate esters applicable to the present invention and is not intended to limit the invention.

The method for effecting the present condensation reactions is a direct single-step process. The benzenediboronate reactant and the dihydroxy compound are combined in the presence or absence of a heat transfer medium, in an inert atmosphere. The reaction mixture is then heated and the secondary reaction product, the alcohol, is removed by distillation. The desired polymeric organoboron compound is then recovered from the residual reaction mass by well-known separation techniques.

For ease of recovery and to obtain a uniform heat distribution throughout the reaction mass, in the preferred embodiment of the invention the present condensation reactions are carried out in the presence of a heat transfer medium. Common hydrocarbon solvents, ethers and glymes, such as benzene, toluene, xylene, n-heptane, chlorobenzene, veratrole (dimethoxybenzene), diethyl ether, dibutyl ether, diphenyl ether, tetraglyme (tetraethyleneglycol dimethyl ether), diglyme (diethyleneglycol dimethyl ether), etc., are all applicable for this use. The only requirement for the heat transfer medium is that it must be inert to the reactants.

The present condensation reactions will proceed regardless of the amount of each reactant present; however, optimum yields and optimum physical properties of the desired product are achieved when stoichiometric amounts of the reactants are present. Therefore, in the preferred embodiment of the invention, the benzenediboronate ester and dihydroxy compound are combined in a 1:2 molar ratio.

So that the present invention can be more clearly understood, the following examples are given for illustrative purposes:

I. 1,4 - bis(di - n - butoxyboryl)benzene, 7.76 grams (0.0199 mole) and 4.38 grams (0.0398 mole) of resorcinol were dissolved in 50 ml. of veratrole in a nitrogen atmosphere. The reaction mixture was then heated at reflux for a period of about 6 hours at which time 5.02 grams (85.1% of theory) of n-butanol had been removed. Most of the veratrole was then removed by distillation at reduced pressure, and the yellow solid product was suspended in petroleum ether and then removed from the reaction vessel. The mixture was filtered and the solids were dried at about 200° C. at reduced pressure. The product when heated to about 330° C. began to melt and was completely melted when the temperature reached about 450° C. Further heating of the melt to about 515° C. caused no change in its appearance, and on cooling it set to a clear, yellow, glassy material. Chemical analysis of the polymeric product showed a recurring structural unit having the empirical formula $C_{18}H_{12}B_2O_4$.

Calculated for $C_{18}H_{12}B_2O_4$: percent B=6.89, percent C=68.8, percent H=3.86. Found in product: percent B=6.52, percent C=65.6, percent H=4.07.

II. 1,4 - bis(di - n - butoxyboryl)benzene, 13.75 grams (0.0352 mole), and 7.77 grams (0.0705 mole) of hydroquinone were added to 50 ml. of diethyl ether. The mixture was then stirred at room temperature for about an hour and the diethyl ether was removed at reduced pressure. The homogenous residue was heated at reflux under reduced pressure for about 2 hours at which time 8.2 grams (78.75% of theory) of butanol had been removed. The residue, which was a foamed, yellow polymeric material, was recovered from the reaction vessel. The product when heated to about 400° C. began to melt and was completely melted when the temperature reached about 450° C. Further heating of the melt to about 500° C. caused no change in its appearance, and on cooling a clear solid yellow polymer formed. Chemical analysis of the polymeric product showed a recurring structural unit having the empirical formula $C_{18}H_{12}B_2O_4$.

Calculated for $C_{18}H_{12}B_2O_4$: percent B=6.89, percent C=68.8, percent H=3.86. Found in product: percent B=6.47, percent C=66.7, percent H=4.04.

III. 1,4 - bis(diphenoxyboryl)benzene, 10.39 grams (0.0221 mole) and 8.23 grams (0.0442 mole) of 4,4'-biphenol were dissolved in 100 ml. of tetraglyme in a nitrogen atmosphere. The reaction mixture was heated at reflux for a period of about 5 hours at which time 4.07 grams (81.7% of theory) of phenol had been removed. Most of the tetraglyme was then removed by distillation at reduced pressure and the resultant yellow solid product was washed from the reaction vessel with petroleum ether. The solvents were evaporated and the product was dried at about 250° C. under reduced pressure. The product when heated to about 300° C. began to melt and was completely melted when the temperature reached about 400° C. Further heating of the melt to about 500° C. caused a very slight discoloration, and on cooling it set to a clear, amber, glassy material. Chemical analysis of the polymeric product showed a recurring structural unit having the empirical formula $C_{30}H_{20}B_2O_4$.

Calculated for $C_{30}H_{20}B_2O_4$: percent B=4.64, percent C=77.4, percent H=4.33. Found in product: percent B=4.37, percent C=75.6, percent H=4.62.

IV. 1,3 - bis(diisopropoxyboryl)benzene, 8.79 grams (0.0263 mole) and 5.79 grams (0.0526 mole) of hydroquinone were combined in 50 ml. of di-n-butyl ether in a nitrogen atmosphere. The reaction mixture was then heated at reflux for a period of about 6 hours at which time 5.27 grams (83.5% of theory) of isopropanol had been removed. The ether was then removed by distillation, and the yellow solid product was removed from the reaction vessel, and dried at about 200 to 250° C. under reduced pressure. The product when heated to about 420° C. began to melt and was completely melted when the temperature reached about 470° C. Further heating of the melt to about 515° C. caused no visible change in its appearance, and on cooling it set to a clear yellow glass. Chemical analysis of the polymeric product showed a recurring structural unit having the empirical formula $C_{18}H_{12}B_2O_4$.

Calculated for $C_{18}H_{12}B_2O_4$: percent B=6.89, percent C=68.8, percent H=3.86. Found in product: percent B=6.45, percent C=67.9, percent H=4.04.

V. 1,3-bis(diethoxyboryl)benzene, 8.90 grams (0.0320 mole) and 11.93 grams (0.0640 mole) of 4,4'-biphenol were added to 100 ml. of toluene in a nitrogen atmosphere. The radiation mixture was heated at reflux for a period of about 5 hours at which time 4.99 grams (84.6% of theory) of ethanol had been removed. The residual mixture was then filtered and the yellow solid filter cake was dried at about 200° C. under reduced pressure. The product when heated to about 300° C. began to melt and was completely melted when the temperature reached about 370° C. Further heating of the melt to about 500° C. caused only a slight discoloration, and on cooling the melt set to a clear yellow glass. Chemical analysis of the polymeric product showed a recurring structural unit having the empirical formula $C_{30}H_{20}B_2O_4$.

Calculated for $C_{30}H_{20}B_2O_4$: percent B=4.64, percent C=77.4, percent H=4.33. Found in product: percent B=4.30, percent C=76.8, percent H=4.68.

VI. 1,3 - bis(diphenoxyboryl)benzene, 11.00 grams (0.0234 mole) and 5.15 grams (0.0468 mole) of resorcinol were added to 75 ml. of tetraglyme in a nitrogen atmosphere. The reaction mixture was heated at reflux for a period of about 6 hours at which time 7.34 grams (88.3% of theory) of phenol had been removed. Most of the tetraglyme was then removed by distillation at reduced pressure and the residue was removed from the reaction vessel. The remaining solvent was evaporated at from about 200 to 250° C. under reduced pressure. The resultant product began to melt when heated to about 310° C. and was completely melted when the temperature reached about 380° C. Further heating of the melt to about 520° C. caused no visible change in its appearance, and on cooling it set to a clear, hard, yellow, glassy material. Chemical analysis of the polymeric product showed a recurring structural unit having the empirical formula $C_{18}H_{12}B_2O_4$.

Calculated for $C_{18}H_{12}B_2O_4$: percent B=6.89, percent C=68.8, percent H=3.86. Found in product: percent B=6.49, percent C=65.9, percent H=4.20.

Other modes of applying the principle of the invention may be employed, change being made as regards the details described, provided the features as stated in any of the following claims or the equivalent of such be employed.

I, therefore, particularly point out and distinctly claim as my invention:

1. Solid, thermally stable polymeric organoboron compounds consisting essentially of the recurring structural unit

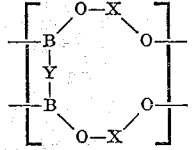

where X is a radical selected from the group consisting of 1,3-phenylene, 1,4-phenylene and 4,4'-biphenylene, and Y is a radical selected from the group consisting of 1,3-phenylene and 1,4-phenylene, said units being linked through boron-oxygen bonds.

2. Solid, thermally stable polymeric organoboron compounds consisting essentially of the recurring structural unit

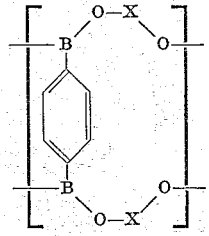

where X is a radical selected from the group consisting of 1,3-phenylene, 1,4-phenylene and 4,4'-biphenylene, said units being linked through boron-oxygen bonds.

3. Solid, thermally stable polymeric organoboron compounds consisting essentially of the recurring structural unit

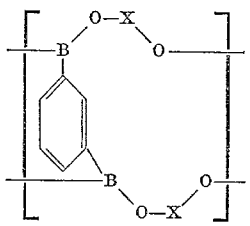

where X is a radical selected from the group consisting of 1,3-phenylene, 1,4-phenylene and 4,4'-biphenylene, said units being linked through boron-oxygen bonds.

4. The method for preparing solid, thermally stable polymeric organoboron compounds consisting essentially of the recurring structural unit

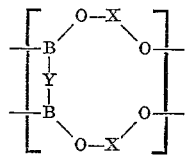

where X is a radical selected from the group consisting of 1,3-phenylene, 1,4-phenylene and 4,4'-biphenylene, said units being linked through boron-oxygen bonds, which comprises heating under reflux in an inert atmosphere, in the presence of a liquid heat transfer medium which is inert to the reactants, a benzenediboronate ester having the formula $(RO)_2B—Y—B(OR)_2$, where Y is a radical selected from the group consisting of 1,3-phenylene and 1,4-phenylene, and R is a radical selected from the group consisting of alkyls of from 1 to 6 carbon atoms and phenyl, with a material selected from the group consisting of hydroquinone, resorcinol and 4,4'-biphenol, said reactants present in a 1:2 molar ratio, respectively, removing the more volatile reaction product by distillation and recovering the desired polymeric organoboron compound from the resultant mass.

References Cited by the Examiner
UNITED STATES PATENTS
3,053,777  9/62  Goldschmid _____ 260—2

OTHER REFERENCES

Nielsen: J.A.C.S., vol. 79, pp. 3081–3084, June 20, 1957.

LEON J. BERCOVITZ, *Primary Examiner.*

J. R. LIBERMAN, WILLIAM H. SHORT, *Examiners.*